Aug. 28, 1928.　　　　　　　　　　　　　　　1,682,147
C. P. RIEGLE
SPARE TIRE CARRIER AND RIM SPREADER
Filed Sept. 28, 1923　　　2 Sheets-Sheet 1
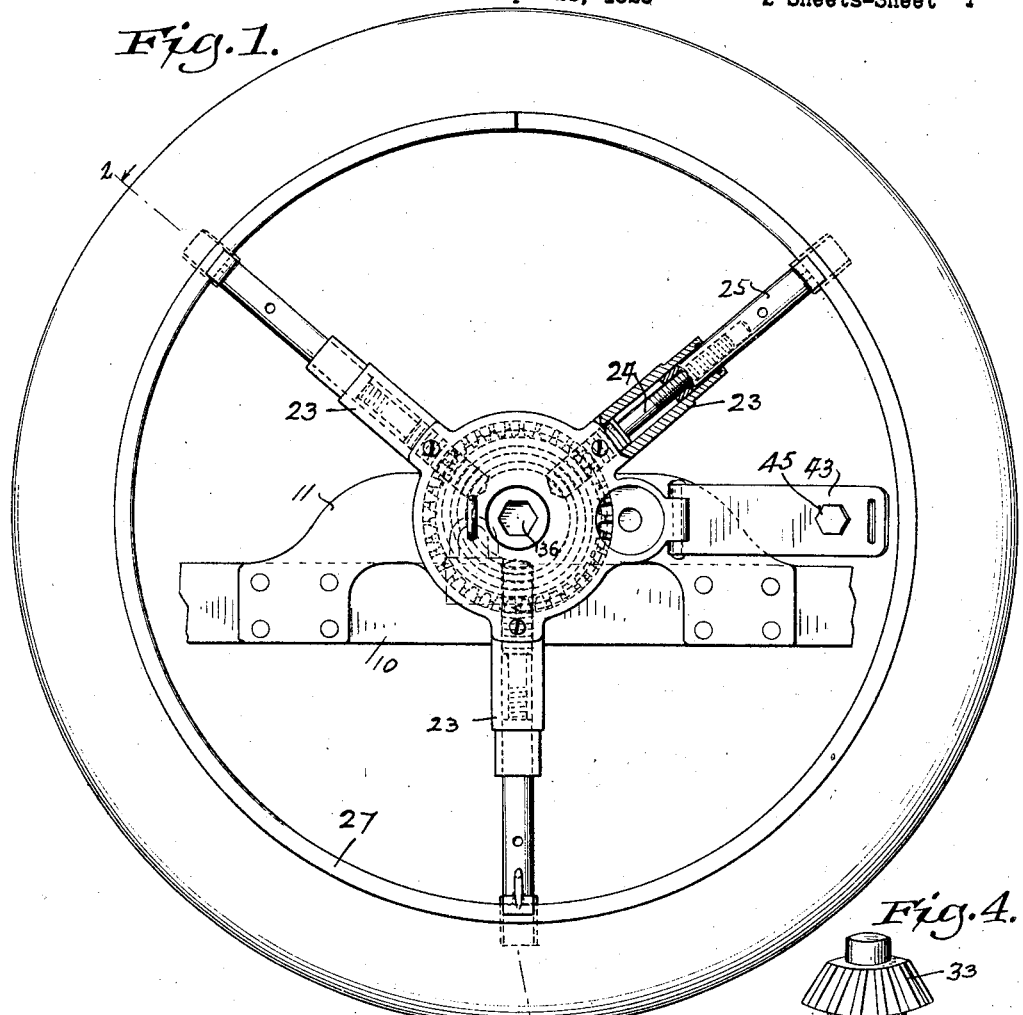
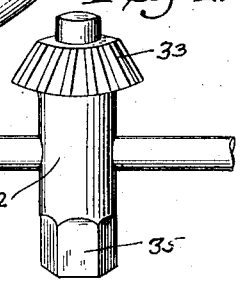
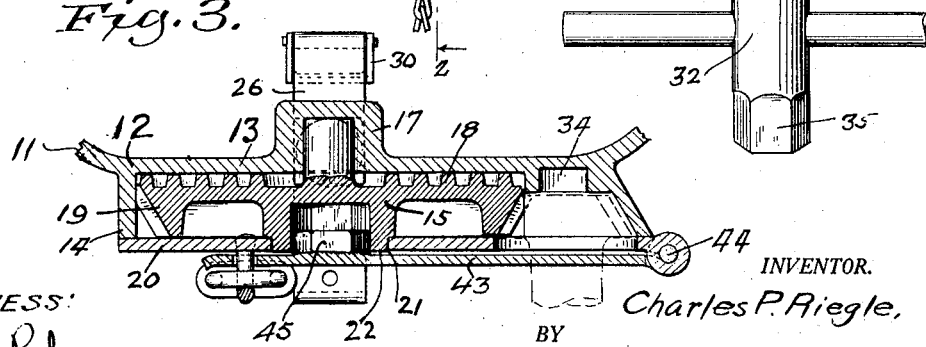
WITNESS:
Fred Palm
DEL.
INVENTOR.
Charles P. Riegle,
BY
Green, Wheeler & Woodard
ATTORNEYS.

Aug. 28, 1928.

C. P. RIEGLE 1,682,147

SPARE TIRE CARRIER AND RIM SPREADER

Filed Sept. 28, 1923    2 Sheets-Sheet 2

INVENTOR.
Charles P. Riegle,
BY
Erwin, Wheeler & Woodland
ATTORNEYS.

WITNESS:
Fred Palm
DEL.

Patented Aug. 28, 1928.

1,682,147

UNITED STATES PATENT OFFICE.

CHARLES P. RIEGLE, OF MILWAUKEE, WISCONSIN.

SPARE-TIRE CARRIER AND RIM SPREADER.

Application filed September 28, 1923. Serial No. 665,283.

My invention relates to spare tire carriers for automobiles, and comprises novel devices for supporting the spare tire. My invention also comprises novel means associated therewith, whereby the tire carrier may be used for the purpose of contracting the rim to facilitate application of the tire and the removal thereof, and also for spreading the rim into proper position when the tire has been placed thereon.

Other features residing in my invention will be later described, and the novelty thereof will be pointed out in the appended claims.

In the drawings:

Figure 1 is a view in elevation of my invention, in position at the rear of an automobile.

Fig. 3 is a horizontal section, somewhat enlarged, through the worm and its associated elements.

Fig. 4 is a view of the wrench or key which is used in operating the invention.

Figure 2:
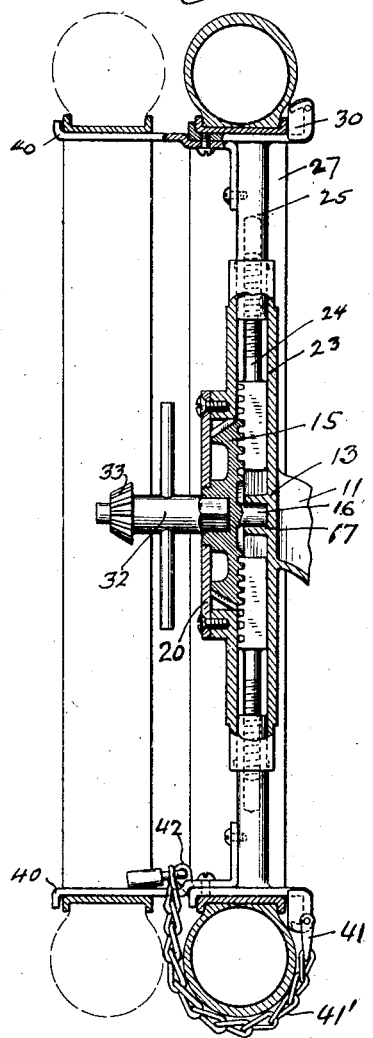
Fig. 2 is a vertical transverse section on the line 2—2, Fig. 1.

In Fig. 1 of the drawings, the numeral 10 indicates a cross bar in an automobile frame, to which a bracket or brackets 11 may be attached. The brackets 11 support a housing 12 for the operating elements. The housing is formed as a back plate 13, provided on its outer face with a circular wall 14, to form a recess in which is rotatably mounted a worm 15, the latter having on its rear face a gudgeon 16, journaled in a bearing 17, formed in the housing. The worm is provided on its rear face with a helix 18, and on its periphery with a spur or bevel gear 19. A face plate 20 is adapted to cover the recess in the housing 12, and enclose the worm, such face plate having a central opening 21, which receives a hollow journal 22 on the outer face of the worm, so that the latter is rotatably supported at both sides.

Radial arms 23, preferably equally spaced about the circumference of the housing, extend from the latter. These radial arms are of tubular formation, and constitute guides for adjustable rods composed of telescoping sections 24 and 25, one being threaded into the other. The threaded connection between the two sections may be placed at any points in their respective lengths as will enable them to meet the requirements in adjusting the device for tires of different sizes. The outer ends of the several sections 24 are provided on one face with gear teeth which engage the spiral 18 of the worm 15, so that in the rotation of the worm, the adjustable rods will be retracted or advanced in a simultaneous movement.

Each section 25 is provided at its free end with a shoe 26, extending transversely of the rim 27 carrying the tire, the shoe having projections at each end to form a fork and prevent lateral movement of the rim from the position in which it is placed. The rear projection 28 is somewhat elongated, and formed at its end with an inwardly extending hook 29, one for each of the radial and adjustable rods, which hooks are adapted to engage the rim in the manner shown in Fig. 6, to contract the rim when the worm is rotated in a direction to achieve that result.

Figure 6:
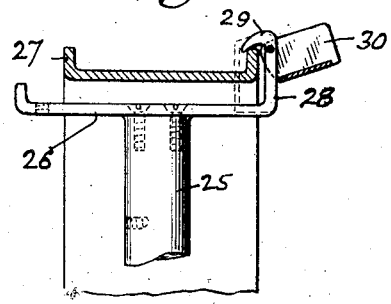

For the purpose of preventing the hooks 29 from chafing the tire supported on the carrier, I provide hinged metal shields 30, which are adapted to be folded into the dotted line position indicated in Fig. 6, and to be turned back to full line position when the rim is to be contracted.

The spur gear 15 may be rotated at different speeds, dependent upon the resistance encountered. Fig. 4 shows a T-wrench 32 which I use at such times. At one end, the wrench is formed with a pinion 33, for engaging the gear 19 of the worm, giving a slow movement of rotation to the latter, the end in advance of the pinion being seated in a recess 34, formed in the housing 12. This arrangement will permit the application of great power when necessary by reason of the reduction in the gear ratio, as shown. But a quicker and direct movement of rotation may be given to the worm by inserting the polygonal head 35 of the wrench in the correspondingly formed socket 36, in the journal 22 at the face of the worm.

Expansion of the rim into position within the tire 37, is effected by the outward movement of the radially arranged adjustable rods, through a reverse rotary movement of the worm 15, the shoes 26 at such time exerting the necessary expanding pressure against the inner face of the rim 27.

Figure 7:
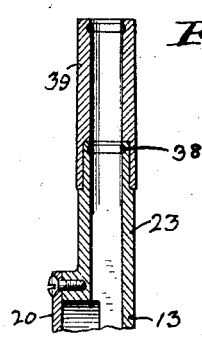

In Fig. 7 I have shown the tubular guides 23 as packed at 38, to exclude moisture. In case it be desired to lengthen the said guides 23, to accommodate radial rods 24, 25 of greater length for use in connection with tires of larger sizes, the mechanism shown may be extended by means of sleeves 39, joined thereto, as in Fig. 7. Such sleeves will be packed at their outer ends, as before.

Figure 5:
Figs. 5, 6 and 7 are details of construction which will be described.

A second spare tire may be supported by means of brackets 40, see Fig. 5, attached to the shoes 26, as shown in Fig. 2. A clevis 41 may be attached to the pivot, of one of the shields 30, and a chain 41', encircling the tire, be employed to guard the latter against unauthorized removal, a padlock connecting the free end of the chain to an eye 42, fixed upon the shoe.

For the purpose of preventing operation of the worm fraudulently, I hinge a plate 43 to the housing 12, as at 44, such plate being in the form of a hasp and adapted to cover the openings in the face plate 20 of the housing, so as to prevent the application of the wrench. A padlock engaging a staple fixed in the cover plate 20, holds the hasp in effective position.

A hexagonal projection 45 is formed upon the inner face of the plate 43, such projection being adapted to enter the recess 36 in the journal 22, so that the parts of the tire carrier, will be effectively locked against accidental movement.

Having thus described my invention, what I claim and desire to secure by Letters Patent of the United States, is:

1. A spare tire carrier adapted to be mounted on the cross bar of an automobile frame, comprising a housing in which is journalled a gear having a worm on one face, radially movable connecting rods engaging the said worm gear at one end, and the tire rim at the other, the said gear being provided peripherally with gear teeth for rotating the worm at one speed, and at its axis with a wrench receiving socket for rotating at a different speed.

2. A spare tire carrier adapted to be mounted on the cross bar of an automobile frame, comprising a housing in which is journalled a gear having a worm on one face, radially movable connecting rods engaging the said worm gear at one end, and the tire rim at the other, means for rotating the said gear, hooks at the ends of the said connecting rods to engage the rim to contract the same, and means covering the said hooks to prevent chafing the tire when supported on the rim.

3. A spare tire carrier adapted to be mounted on the cross bar of an automobile frame, comprising a housing in which is journalled a gear having a worm on one face, radially movable connecting rods engaging the said worm gear at one end, and the tire rim at the other, means for rotating the said gear, hooks at the ends of the said connecting rods to engage the rim to contract the same, and pivoted shields adapted to cover the said hooks and prevent chafing of the tire when supported on the rim.

4. A spare tire carrier adapted to be mounted on the cross bar of an automobile frame, comprising a housing in which is journalled a gear having a worm on one face, radially movable connecting rods engaging the said worm gear at one end, and the tire rim at the other, tubular guides for the said connecting rods, and means for extending the said guides to accommodate lengthened connecting rods.

In testimony whereof, I have signed my name at Milwaukee, this 22nd day of September, 1923.

C. P. RIEGLE.